United States Patent [19]
Watts et al.

[11] Patent Number: 5,671,411
[45] Date of Patent: Sep. 23, 1997

[54] METHOD OF SEARCHING AN AUDIO/ VISUAL PROGRAMMING DATABASE USING SELECTED CRITERION HAVING IMPLICIT LOGICAL OPERATION

[75] Inventors: Michael Watts, Morgan Hill; Robert Nazarenus, San Jose; Kathleen Lane, Los Altos; Fai-To Leung; Alan Steinhauer, both of Sunnyvale, all of Calif.

[73] Assignee: Intel Corporation, Santa Clara, Calif.

[21] Appl. No.: 483,716

[22] Filed: Jun. 7, 1995

Related U.S. Application Data

[63] Continuation-in-part of Ser. No. 337,285, Nov. 10, 1994, Pat. No. 5,606,691.

[51] Int. Cl.$^6$ ............................................. G06F 17/30
[52] U.S. Cl. .................... 395/615; 395/604; 348/906
[58] Field of Search ................................ 395/600, 604, 395/615

[56] References Cited

U.S. PATENT DOCUMENTS

| | | | |
|---|---|---|---|
| 4,115,846 | 9/1978 | Laine | 364/200 |
| 4,706,121 | 11/1987 | Young | 358/142 |
| 4,879,648 | 11/1989 | Cochran et al. | 364/300 |
| 4,939,689 | 7/1990 | Davis et al. | 364/900 |
| 5,206,949 | 4/1993 | Cochran et al. | 364/300 |
| 5,220,625 | 6/1993 | Hatakeyama et al. | 382/54 |
| 5,241,671 | 8/1993 | Reed et al. | 395/600 |
| 5,253,066 | 10/1993 | Vogel | 358/188 |
| 5,278,980 | 1/1994 | Pedersen et al. | 395/600 |
| 5,353,121 | 10/1994 | Young et al. | 348/563 |
| 5,463,543 | 10/1995 | Wagner | 364/141 |
| 5,479,268 | 12/1995 | Young et al. | 358/335 |
| 5,483,278 | 1/1996 | Strubbe | 348/7 |
| 5,483,586 | 1/1996 | Sussman | 379/201 |

*Primary Examiner*—Thomas G. Black
*Assistant Examiner*—Donald D. Min
*Attorney, Agent, or Firm*—Blakely, Sokoloff, Taylor & Zafman

[57] ABSTRACT

A method of searching a database uses a plurality of search criteria each having an implicit logical operation associated therewith. After one or more of the search criteria is selected, a computer system with appropriate software formulates the search including the implicit logical operation to search the database, all without the need for the user to input any logical operation connecting the one or more of the selected desired search criterion. An operation is performed on a portion of the search result.

10 Claims, 5 Drawing Sheets

METHOD OF SEARCHING AN AUDIO/VISUAL PROGRAMMING DATABASE USING SELECTED CRITERION HAVING IMPLICIT LOGICAL OPERATION

RELATED APPLICATIONS

This application is a Continuation-In-Part of commonly-assigned, application Ser. No. 08/337,285 (filed Nov. 10, 1994) now U.S. Pat. No. 5,606,691 issued Feb. 25, 1997.

MICROFICHE APPENDIX

This application is submitted with a microfiche appendix, Exhibit A, containing copyright material, Copyright 1994, Intel, Corp., consisting of seven (7) fiches with six hundred eighty (680) frames.

The copyright owner has no objection to the facsimile reproduction by anyone of the patent document or the patent disclosure, as it appears in the Patent and Trademark Office patent file or records, but otherwise reserves all copyrights whatsoever in the appendix.

TECHNICAL FIELD

This invention relates to a method of searching a database without the need for a user to explicitly input one or more logical operations connecting the search criteria. More particularly, this invention relates to a method of searching a database comprising an audio visual programming schedule, such as a television broadcast schedule, using search criteria selected by a user, without inputting logical operations for the search criteria.

BACKGROUND OF THE INVENTION

Methods for searching a database are well known in the art. Typically, a user inputs or selects a plurality of search criteria. In addition, the user inputs one or more logical operations, such as AND, OR etc., connecting the plurality of search criteria. Based upon the plurality of search criteria and the logical operations connecting the search criteria, the database is searched. An example of a search query may be criterion A AND, criterion B NOT, criterion C OR criterion D. Thus, in the prior art, the search for a database has necessitated the user selecting or inputting a plurality of search criteria and one or more logical operations logically connecting the search criteria. However, by requiring the user to input logical operations, difficulties can be created with users who are not "technically" oriented.

Finally, it is well known that audio visual programming schedules, such as off-the-air broadcast schedule of television signals, can comprise a database. Thus, the application of search methods to search such programming schedules but without the need for the user to input logical operations would greatly facilitate the search of the programming schedule.

SUMMARY OF THE INVENTION

In the present invention, a method of searching a database uses a computer having a display device with a pointing device for visually indicating a position through a cursor means on the display device. The method comprises the steps of displaying a plurality of search criteria on the display device with each of the plurality of search criteria having a logical operation associated therewith. The cursor means can be moved on the display device by the user, through the use of the pointing device to a desired one of the plurality of the displayed search criteria. One or more of the plurality of displayed search criteria can be selected by the user by activating the pointing device when the cursor means is positioned over the desired criterion. The database is searched by the computer after selecting all the desired search criteria, using the logical operations associated with all the desired search criteria without the user inputting any logical operation. The results of the search are displayed on the display device and an operation is carried out on a portion of the search result.

DETAILED DESCRIPTION OF THE DRAWINGS

Figure 1:
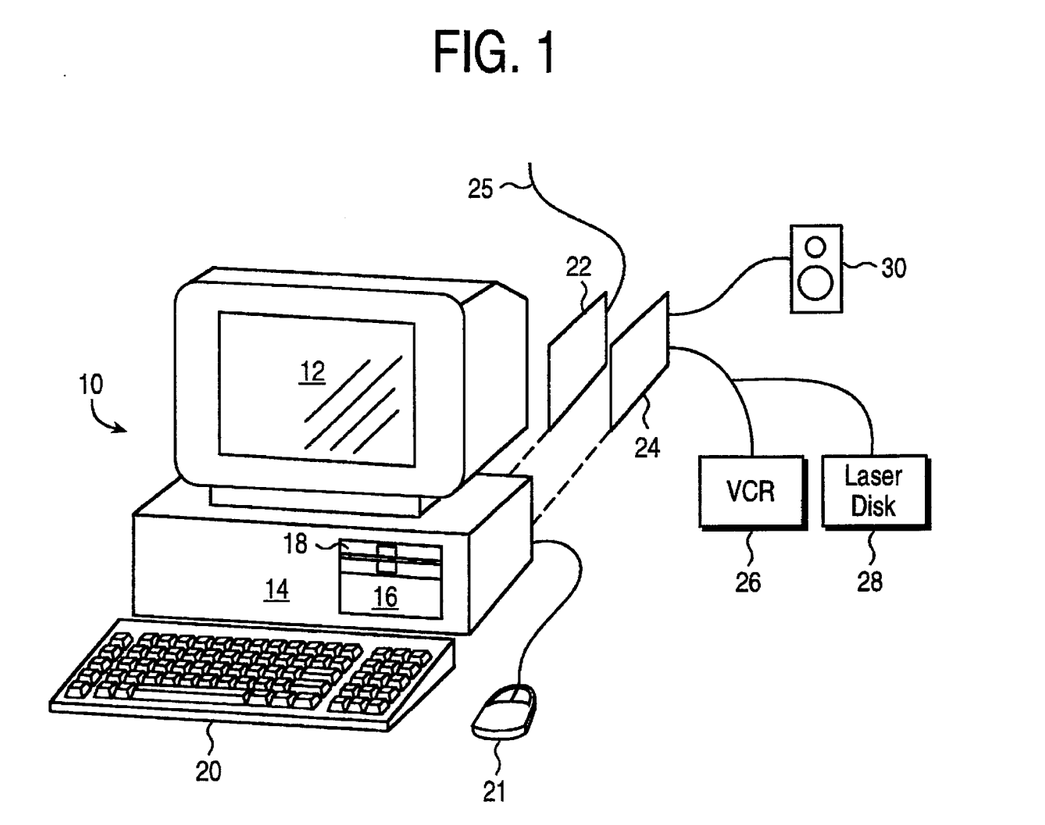
FIG. 1 is a schematic block level diagram of a computer system suitable for carrying out the portion of the method of the present invention for searching a database.

Referring to FIG. 1 there is shown a block level diagram of a computer system 10 suitable for carrying out the method of the present invention. The computer system 10 can be a well known IBM PC compatible computer system with an Intel X86 microprocessor or a compatible microprocessor, executing the Windows Operating System program available from Microsoft Corporation. (IBM and Intel are registered trademarks of IBM and Intel respectively. Windows and Microsoft are registered trademarks of Microsoft Corporation.) The system 10 comprises a housing 14 containing a motherboard having the microprocessor and necessary memory (not shown). In addition, the system 10 comprises peripheral components such as a hard disk drive 16 and a floppy disk drive 18. The system 10 also receives input signals from a keyboard 20 and a pointing device, such as a mouse 21, both of which can be operated and activated by the user, respectively. Finally, the system 10 has a display device 12 for displaying the output of the system 10. Such a computer system 10, as previously stated, is well known in the art and can be purchased "off the shelf".

The method of the present invention is practiced by executing a program stored on the hard disk 16 by the computer system 10. The program executed by the computer system 10 for implementing of the method of the present invention is a software application program operating under Windows. The program, in source code listing, is set forth in the microfiche appendix A. The program is written in Visual Basic 3.0, available from Microsoft Corporation, and C-Language along with code written in VBX.

Although not necessary to the method of the present invention, the computer system 10 can also comprise a modem 22 having a telephone line 25 connected to a public carrier. Such a modem 22 is well known in the art and can be on an expansion card that can be plugged into any one of the expansion cards available in the computer system 10 on the motherboard. In addition, the system 10 can comprise a tuner expansion card 24. Similar to the modem card 22, the tuner card 24 can be electrically connected to any one of the interface slots available on the motherboard of the computer system 10. In the preferred embodiment, the tuner board is a PC Prime Time V-6 and is available from Charter Electronic Inc. (PC Prime Time is a registered trademark of Charter Electronic Inc.) The tuner board 24 can be connected to a speaker 30 for audio output and can be connected to a VCR 26 and/or a laser disk 28 for a visual output.

As previously stated, the method of the present invention is implemented by executing the program, set forth in Appendix A. The program, in part, assists the user to search through a database comprising a programming schedule of off-the-air broadcast television schedule. In one embodiment, the database can be obtained by the modem 22, from a bulletin through the public telephone line 25 through a public carrier. In another embodiment, the database can be obtained by inputting programming schedule recorded on one or more magnetic disks through the floppy disk drive 18. Finally, the database can even be obtained from "off-the-air" broadcast through the tuner 24 in accordance with the teaching of U.S. Pat. No. 4,706,121. However, In the preferred embodiment, the database is obtained from the public bulletin board through the public carrier 25 or through the floppy disk drive 18. Approximately two-weeks' worth of programming data ca be stored on the hard disk 16.

Figure 2:
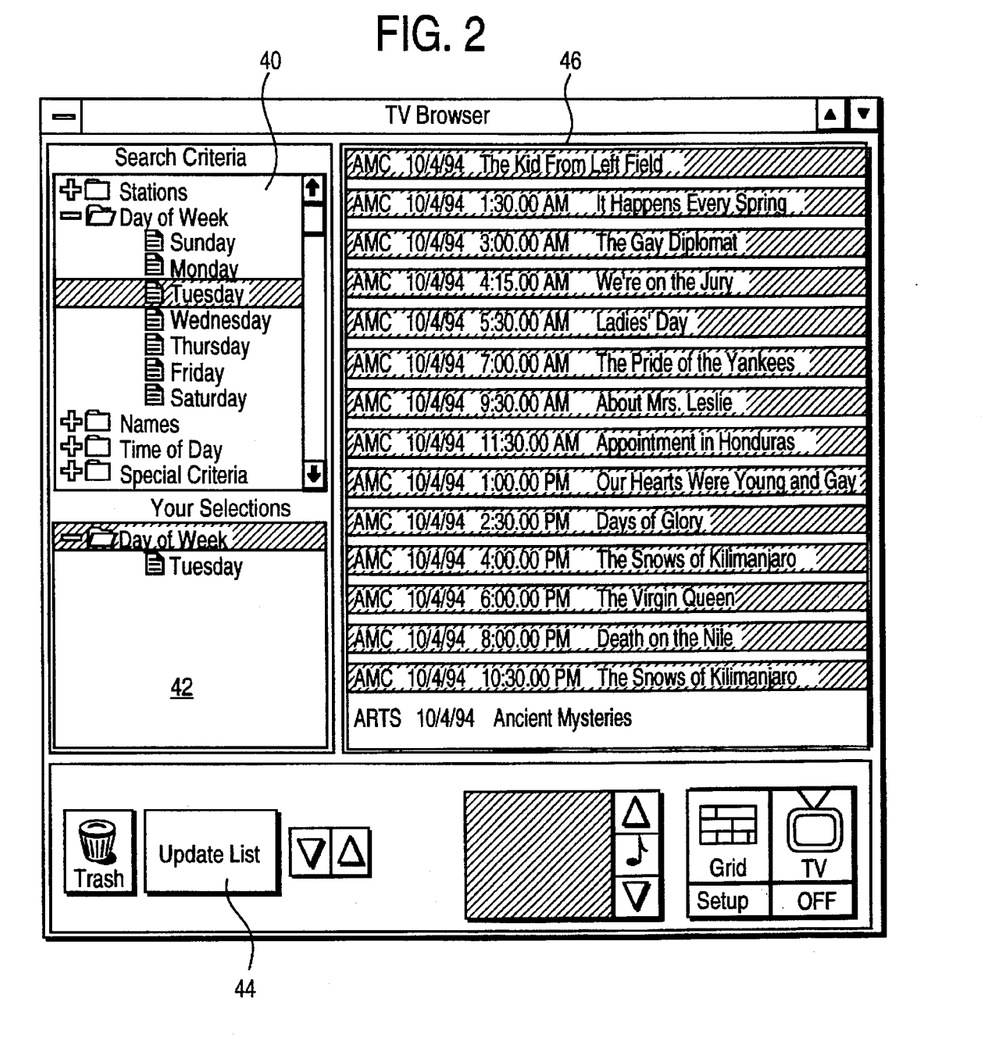
FIG. 2 is an example of a first display on the display device of the computer system shown in FIG. 1, in carrying out the method of the present invention.

In the method of the present invention, when the program set forth in Appendix A is executed, a display screen such as that shown in FIG. 2, is displayed on the display device 12. The display screen comprises three parts. In a first portion 40 of the display screen, a list of search criteria is displayed. Two types of search criteria are displayed in the first portion 40. A first type consists of five (5) different search criteria: stations, days of the week, names, time of the day, and special criteria. Within the search criterion of stations, is a list of sub-criteria which include all the available calling codes of the television stations broadcasting within the vicinity of the user.

To "open" the search criterion "stations", the user through the mouse 21 moves or positions a cursor over the search criterion of "stations" and clicks on the mouse 21. This will then display a plurality of sub-criteria of station codes that broadcast television programs which the user can receive.

Within the search criterion of "day of week", are the sub-criterion of: Sunday, Monday, Tuesday, Wednesday, Thursday, Friday, and Saturday. Again, to activate and select one of these seven (7) search sub-criterion, the user, through the mouse 21, positions the cursor over the "day of week" criterion and by clicking the mouse 21, opens the search criterion of "day of week" to display the seven (7) sub-criteria within the category of "day of week" As can be seen in FIG. 2, the icon of "day of week" showing a folder like image is open to show the criteria that are contained within the criterion of "day of week".

The search criterion of "names" when opened, permits the user to input the name of an actor or actors, director, and a title of a particular movie or show with which the user seeks the search of in the database.

Within the search criterion of "time of day" when activated, four (4) sub-criteria of time periods would be displayed. In the preferred embodiment, they are "day", "noon", "prime" and "night" Of course, it is possible to even set forth the sub-criteria by hours or sub-hour segments.

Within the search criterion of "special criteria", when activated, the user would find the following plurality of sub-criteria: "black and white", "closed caption", "colorized", "network", "paid programming", "stereo", and "syndicated".

Each of the aforementioned search criterion and its respective sub-criteria are for illustration purposes and clearly the invention is not limited to these particular types of search criteria, or their sub-criteria.

As previously discussed, the user opens the displayed search criteria by clicking on the mouse 21 when the cursor is positioned over the particular search criterion of interest to display further searchable sub-criteria. If one of the further searchable sub-criterion is desired, the user then moves the mouse 21 until the cursor is positioned over the particular sub-criterion. For example, as shown in FIG. 2, the cursor is positioned over the searchable sub-criterion of "Tuesday". If the sub-criterion of "Tuesday" is desired, the user clicks on the mouse 21 and "drags" the sub-criterion of "Tuesday" into a second portion 42 of the display 12. The computer 10 executing the programming would respond by displaying a duplicate copy of the sub-criteria "Tuesday" in the second portion 42 of the display 12.

After the user has selected one or more search criterion (including any sub-criterion) from the first plurality of the five (5) criteria, the user then proceeds to select a search criterion (or its associated sub-criterion) from a second plurality. The second plurality of search criteria is also displayed in the first portion 40 of the display 12. The second plurality of search criteria comprises generally the type of subject matter for the programming that the user desires to search. Thus, the search criteria in the preferred embodiment of the second plurality are "entertainment", "financial", "health", "hobbies/crafts", "instructional", "movies", and "sports". Each of these search criteria from the second plurality is subdivided into further sub-criteria. The sub-criteria are displayed when the icon for the search criteria is opened by positioning the cursor over the particular search criterion and activating or "clicking" the mouse 21. The system 10 responds by displaying the sub-criteria within that one selected criterion of the second plurality.

Similar to the discussion for the selection of a search criterion from the first plurality, a search criterion from the second plurality is selected by positioning the cursor over the desired search criterion (or its sub-criterion), clicking on the mouse 21 and "dragging" the activated search criterion into the second portion 42 of the display 12.

It should be noted that the user need not select all the desired criteria from the first plurality before selecting the desired criteria from the second plurality. The order in which the desired criteria (or desired sub-criteria) are selected from the first portion 40 and dragged into the second portion 42 is not important.

When the user has selected all the desired search criterion or sub-criterion, from the first portion 40, and the desired criteria are displayed in the second portion 42, the user then positions the cursor over the icon "update list" 44 and clicks the mouse 21. The programming executing on the computer system 10 would then search through the database of programming schedule to determine those programs satisfying the desired criteria displayed in the second portion 42. The results of the search would be displayed in the third portion 46, without the need for the user further inputting the logical operation connecting the selected desired criteria in the second portion 42. The manner in which the program searches through the database using the selected criteria is as follows.

Figure 3:
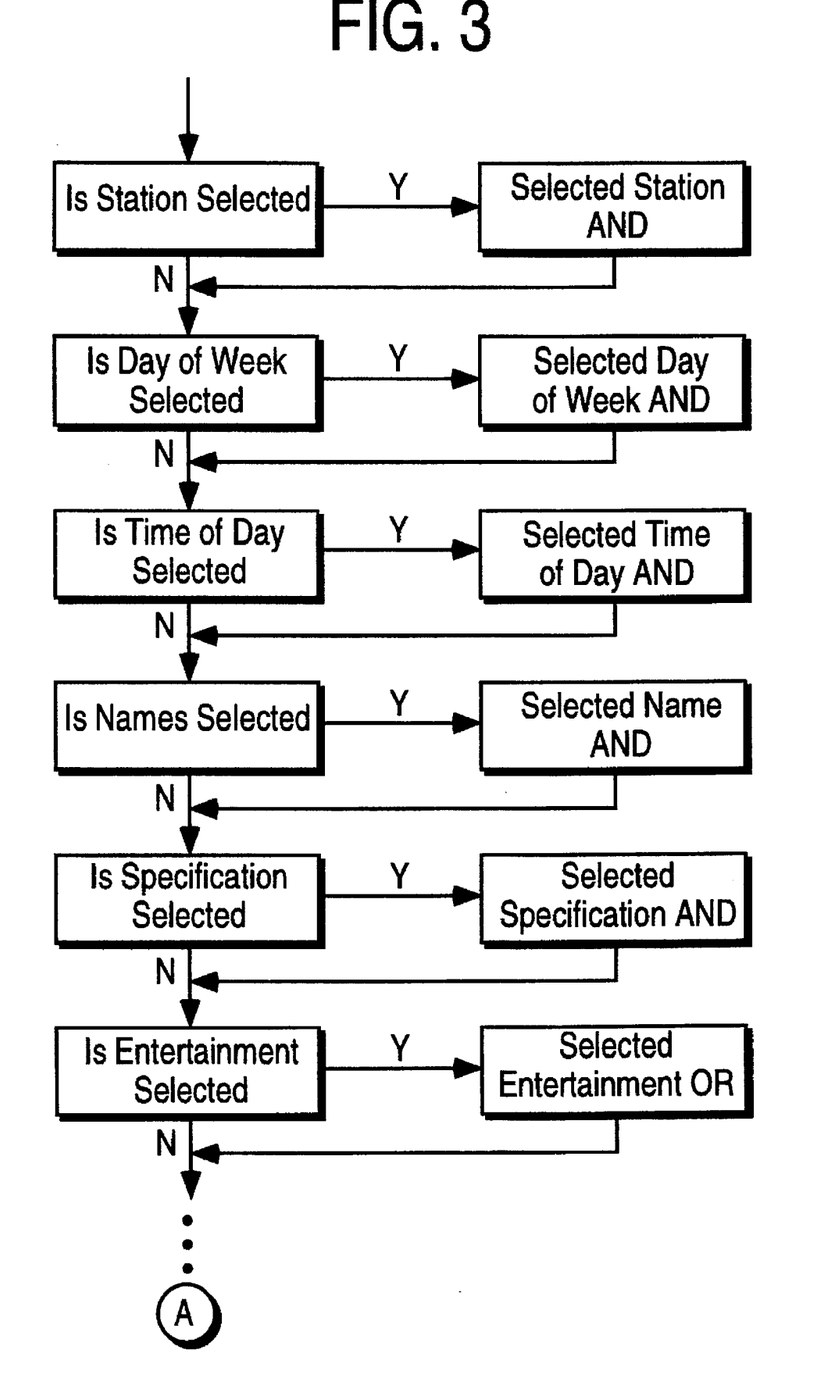
FIG. 3 is a flow chart of a first portion of the program executed by the computer system to carry out the portion of the method of the present invention for searching a database.

Referring to FIG. 3 there is shown a flow chart of the portion of the program set forth in Appendix A showing the portion of the method of the present invention for searching a database. As previously discussed, there are two pluralities of search criteria. For the first plurality comprising of the five search criteria: "stations", "day of week", "names", "time of day", and "special criteria", an implicit logical operation of AND is associated with each of these search criteria. Thus, if any search criterion is selected from this first plurality, the program automatically associates the logical operation of "AND" to each of the selected desired criterion. Therefore, as shown in FIG. 3, if a station is selected, then the selected station has a logical operation of AND associated with the selected station by the program. Similarly, for any selected day of the week criterion, the program associates a logical operation of AND therewith as well. If no sub-criterion is selected from a criterion the program assumes that all of the sub-criteria are desired, or the entire criterion is desired. Thus, for example, if no specific station is selected, then the program assumes that the user desires to search for all stations, as if the criterion of "stations" is selected.

With respect to the search criteria from the second plurality, the program automatically associates the logical operation of "OR" with each of the selected sub-criterion. If no subs-criterion within a search criterion is selected, the program assumes that none of the sub-criteria is desired.

When the update list icon is activated after all the desired criteria have been selected and have been dragged into the second portion 42, the computer system 10 executing the program set forth in Exhibit A, forms a search based upon the desired selected criteria from the first plurality ANDed together to form a result, and with the result ANDed with each of the desired selected criteria from the second plurality which had been ORed. The results of the search of the database of programming schedules are displayed in the third portion 46.

Thus, for example, if the user selected the following sub-criteria:

KCBS (station)

evening (time)

Tuesday (day of week)

Financial

Sports

The computer systems 10 searches the database for programs satisfying the following relationship:

KCBS AND evening AND Tuesday AND "all names" AND "all special criteria" AND financial; OR KCBS AND evening AND Tuesday AND "all names" AND "all special criteria" AND Sports.

With the result displayed in the third portion 46 of the display 12, the user can position the cursor over each one of the desired results and by clicking on the mouse 21, select the desired result.

Figure 4:
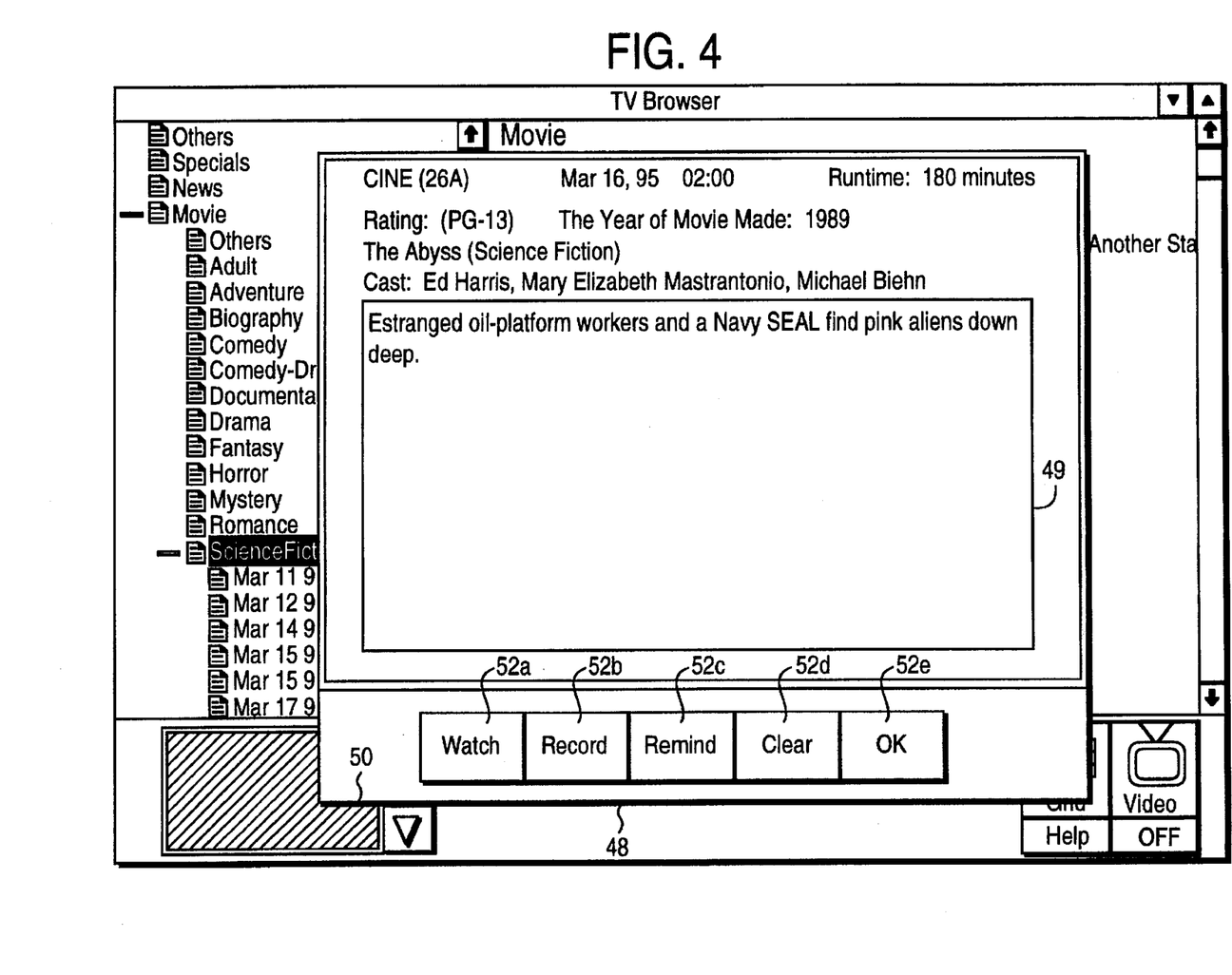
FIG. 4 is an example of a second display on the display device of the computer system shown in FIG. 1, in carrying out the portion of the method of the present invention for operating on a search result.

FIG. 4 shows the display 12 after the user selected, from the third portion 46 of the display 12, "The Abyss" as a desired result. In a fourth portion 48 of the display screen, information about the selected desired program is displayed. The information includes the type of the selected desired program ("Movie", in FIG. 4), the title of the selected desired program ("The Abyss", in FIG. 4), a short description of the selected desired program (shown in FIG. 4 in a sub-portion 49 of the fourth portion) and other information appropriate to the type of the selected desired program. For example, while it is appropriate to display "Rating" information for a movie, it may not be appropriate to display "Rating" information for an ordinary television show.

In a sub-portion 50 of the fourth portion 48 of the display screen, icons 52a–52e are displayed. In response to the user selecting and activating one of the icons 52a–52e, the program executing on the computer system 10 takes a particular action with respect to the selected desired program. Thus, the results of the search in the database can be used to activate particular functions of the executing program.

In response to the user selecting and activating icon 52a, labelled "Watch", the program executing on the computer system 10 causes the tuner card 24 to tune in the selected desired program on the desired channel, if the program is currently being broadcast.

In response to the user selecting and activating icon 52b, labelled "Record", the program causes the VCR 26 to commence the recording of the desired program at the desired time and at the desired channel. If the selected desired program is currently being broadcast, the program executing on the computer system 10 causes the VCR 26 to immediately commence the recording of the desired program.

In response to the user selecting and activating icon 52c, labelled "Remind", the program executing on the computer system 10 adds the desired program to a reminder list, so that the user can be reminded of the program at, or just previous to, the time that the desired program is to be broadcast.

In response to the user selecting and activating icon 52d, labelled "Clear", the program executing on the computer system 10 deletes the selected program from the search result.

In response to the user selecting and activating icon 52e, labelled "OK", the program executing on the computer system 10 takes no action other than to return to displaying the screen shown in FIG. 3, on which search results are displayed in the third portion 46.

Figure 5:
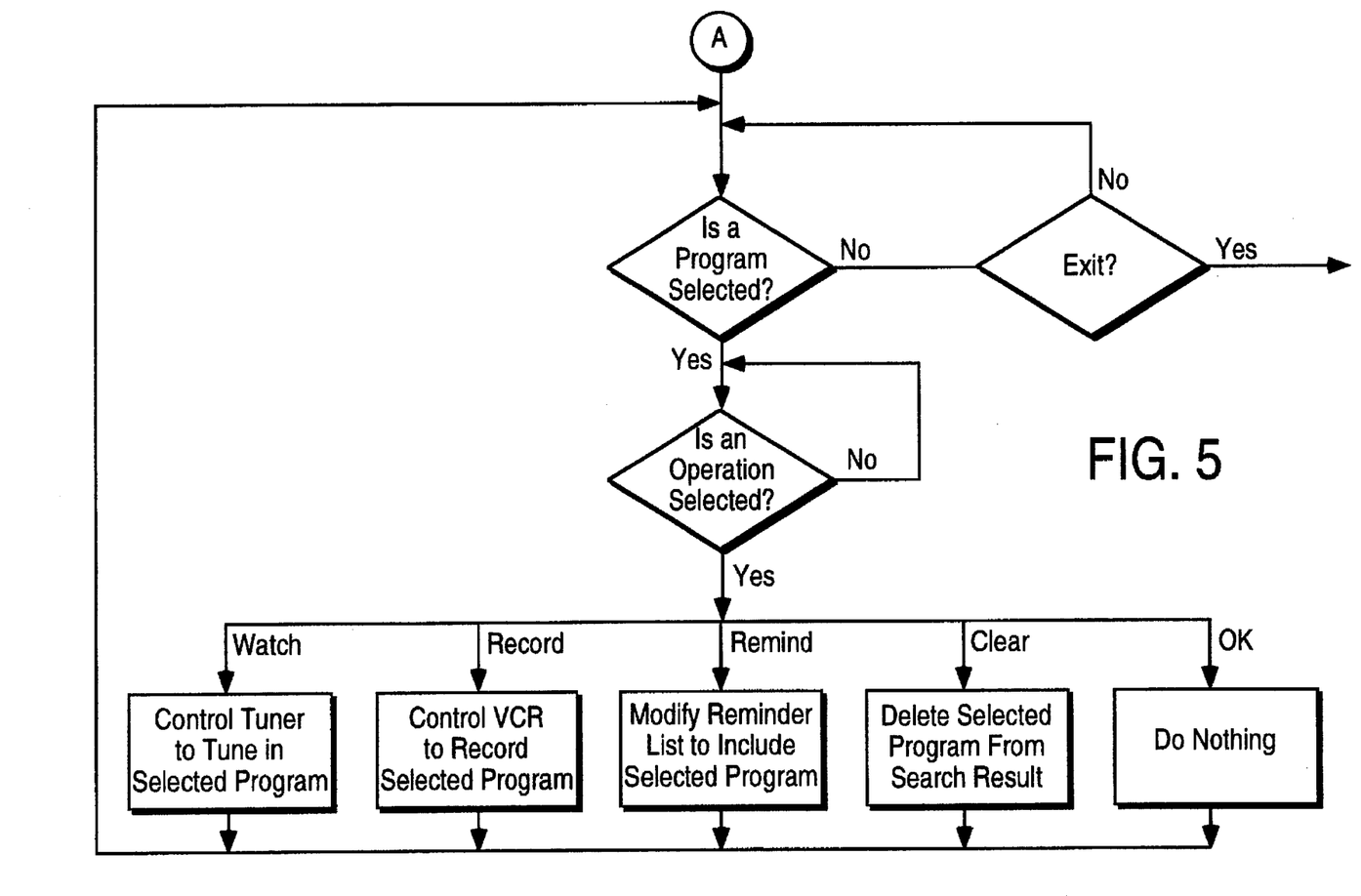
FIG. 5 is a flow chart of a second portion of the program executed by the computer system to carry out the portion of the method of the present invention for operating on a search result.

Referring to FIG. 5 there is shown a flow chart of the portion of the program set forth in Appendix A showing the portion of the method of the present invention for operating on a search result.

Although the preferred embodiment has been described where the particular actions from which the user can select are "Watch", "Record", "Remind", "Clear", and "OK" (i.e., no action), the method of the present invention need not be so limited. Furthermore, although the preferred embodiment has been described wherein the selected search criterion from the first portion 40 is selected by activating the mouse 21 and "dragging it" into the second portion 42, the method of the present invention need not be so limited. Thus, for example, the user may simply activate the desired search criteria in the first portion 40 by "double clicking" or "shift clicking" the mouse 21 when the cursor is positioned over the desired search criterion. The "double clicking" or "shift clicking" of the mouse 21 can cause a highlight of the desired search criterion. When all the desired search criteria have been so highlighted, the cursor means is then positioned over the update list 44 and is activated. The program executing on the computer system 10 would respond in the manner described heretofore by performing the necessary logical operation implicitly associated with each of the highlighted criteria displayed in the first portion 40. In this manner, the "dragging" of each of the desired criterion from the first portion 40 to the second portion 42 is avoided, but achieving the same desired result of forming the necessary search of the database by the implicit logical operations associated with the selected search criteria.

It should be further understood that the method of the present invention need not be limited solely to the search of a database of programming schedule or for carrying out the particular described operations. The method of the present invention can be practiced to search for any type of database and to carry out any operation on the search result. The advantage of the method of the present invention is that it avoids the necessity of the user inputting logical operations which can be confusing.

What is claimed is:

1. A method of searching an audio/visual programming database using criteria selected by a user, by the use of a computer having a display device and a pointing device for visually indicating a position on the display device through a cursor means, said method comprising the steps of:

a) scrollably and consecutively displaying a plurality of scheduling search criteria followed by a plurality of subject search criteria in a first area on said display device, and implicitly associating each of said plurality of scheduling search criteria with an AND logical operation and each of said plurality of subject search criteria with an OR logical operation;

b) moving the cursor means on the display device by the user; through the use of the pointing device to a desired one of said displayed search criteria;

c) selecting one or more of said displayed search criteria by the user activating the pointing device and dragging desired ones of the displayed search criteria to a second area of said display device;

d) scrollably and consecutively displaying the selected search criteria in the second area of said display device;

e) searching said audio/visual programming database by the computer using the logical operations implicitly associated with the selected search criteria; and f) displaying in a third area of said display device the result of said search.

2. The method as set forth in claim 1, wherein the method further comprises the steps of:

g) moving the cursor means on the display device by the user, through the use of the pointing device to a desired portion of said search result;

h) selecting said desired portion of said search result by the user activating the pointing device when said cursor means is position over said desired portion of said search result;

i) displaying at least a sub-portion of said selected desired portion of said search result and a plurality of operation representations in a fourth area of said display device, the operation representations representing available operations to be performed in accordance with the displayed sub-portion of search result;

j) selecting by the user a desired one of the represented operations; and k) performing the selected operation, or causing the selected operation to be performed.

3. The method as set forth in claim 2, wherein said available operations include
   controlling a tuning means to receive a selected audiovisual program;
   controlling a video recording means to record a selected audiovisual program,
      adding a selected audiovisual program to a reminder list, and/or removing a selected audiovisual program from said search result.

4. The method of claim 1, wherein said plurality of schedule search criteria comprises:
   stations, day of week, and time of day.

5. The method of claim 1, wherein said plurality of subject search criteria comprises:
   entertainment, financial, sports, health, movies and hobbies, and crafts.

6. An apparatus comprising:
   a display device;
   a pointing device for controlling a cursor means on said display device;
   a storage medium having stored therein programming instructions implementing functions for
      a) scrollably and consecutively displaying a plurality of scheduling search criteria followed by a plurality of subject search criteria in a first area on said display device, and implicitly associating each of said plurality of scheduling search criteria with an AND logical operation and each of said plurality of subject search criteria with an OR logical operation,
      b) facilitating movement of the cursor means on the display device by a user; through the use of the pointing device to a desired one of said displayed search criteria,
      c) facilitating selection of one or more of said displayed search criteria by the user activating the pointing device and dragging desired ones of the displayed search criteria to a second area of said display device;
      d) scrollably and consecutively displaying the selected search criteria in the second area of said display device;
      e) searching an audio/visual programming database using the logical operations implicitly associated with the selected search criteria, and
      f) displaying in a third area of said display device the result of said search; and
   a processor coupled to the display device, the pointing device, and the storage medium for executing the programming instructions.

7. The apparatus as set forth in claim 6, wherein the programming instructions further implement functions for:

g) facilitating movement of the cursor means on the display device by the user, through the use of the pointing device to a desired portion of said search result;

h) facilitating selection of said desired portion of said search result by the user activating the pointing device when said cursor means is position over said desired portion of said search result;

i) displaying at least a sub-portion of said desired portion of said search result and a plurality of operation representations in a fourth area of said display device, the operation representations representing available operations to be performed in accordance with the displayed sub-portion of search result;

j) facilitating selection by the user a desired one of the represented operations; and k) performing the selected operation, or causing the selected operation to be performed.

8. The apparatus as set forth in claim 7, wherein
   the apparatus further comprising a tuning means coupled to the processor, and the apparatus is further coupled to a video recording means; and
   the available operations includes:
      controlling the tuning means to receive a selected audiovisual program,
      controlling the video recording means to record a selected audiovisual program, adding a selected audiovisual program to a reminder list, and/or removing a selected audiovisual program from said search result.

9. The apparatus of claim 6 wherein said plurality of schedule search criteria comprises:

stations, day of week, and time of day.

10. The apparatus of claim 6, wherein said plurality of subject search criteria comprises:

entertainment, financial, sports, health, movies and hobbies, and crafts.

* * * * *